United States Patent
Moody et al.

Patent Number: 5,729,187
Date of Patent: Mar. 17, 1998

[54] TRANSMISSION SHIFT INTERLOCK

[75] Inventors: John W. Moody; Steve R. Hojnacki, both of Clarkston, Mich.

[73] Assignee: Pontiac Coil, Inc., Waterford, Mich.

[21] Appl. No.: 565,687

[22] Filed: Dec. 1, 1995

[51] Int. Cl.$^6$ .................................................. H01F 7/08
[52] U.S. Cl. .................. 335/228; 74/477; 192/4 A
[58] Field of Search .......................... 335/228, 173, 335/110, 255; 192/4 A; 74/477, 476, 483 R

[56] References Cited

U.S. PATENT DOCUMENTS

| | | |
|---|---|---|
| 4,520,640 | 6/1985 | Kramer . |
| 4,550,628 | 11/1985 | Yarnell ............................ 74/477 |
| 4,724,722 | 2/1988 | Beauch et al. . |
| 4,767,955 | 8/1988 | McDaniel ....................... 335/228 |
| 4,821,605 | 4/1989 | Dzioba . |
| 5,014,030 | 5/1991 | Aston ............................. 335/228 |
| 5,018,610 | 5/1991 | Rolinski et al. . |
| 5,027,929 | 7/1991 | Ratke et al. . |
| 5,027,931 | 7/1991 | Ratke et al. . |
| 5,035,156 | 7/1991 | Roble . |
| 5,078,242 | 1/1992 | Ratke et la. . |
| 5,133,436 | 7/1992 | de Crouppe et al. . |
| 5,176,231 | 1/1993 | Moody et al. .................. 192/4 A |

Primary Examiner—Lincoln Donovan
Attorney, Agent, or Firm—Young & Basile, P.C.

[57] ABSTRACT

A holding device and a transmission shift interlock mechanism employing the holding device. The holding device is intended to immobilize a cable and includes a generally cylindrical electromagnet with a central passageway extending therethrough and a holding assembly comprised of a ferromagnetic body joined to a tubular non-magnetic stem. The ferromagnetic body and stem have a passageway therethrough and the stem passes through the central passageway of the electromagnet. The cable passes slidably through the stem and a stop collar is secured to the cable immediately forwardly of the stem for abutting coaction with the forward end of the stem. In the transmission shift interlock mechanism, the cable extends from an ignition switch interlock member to a park/lock member pivotally mounted beneath the steering column of the vehicle and acting in the locked position thereof to preclude movement of the shift lever detent from the park detent position to a drive or reverse detent position of the vehicle automatic transmission. The holding device is piggy-backed on the cable proximate the park/lock lever and includes a mounting bracket securing the holding device proximate the park/lock member.

12 Claims, 4 Drawing Sheets

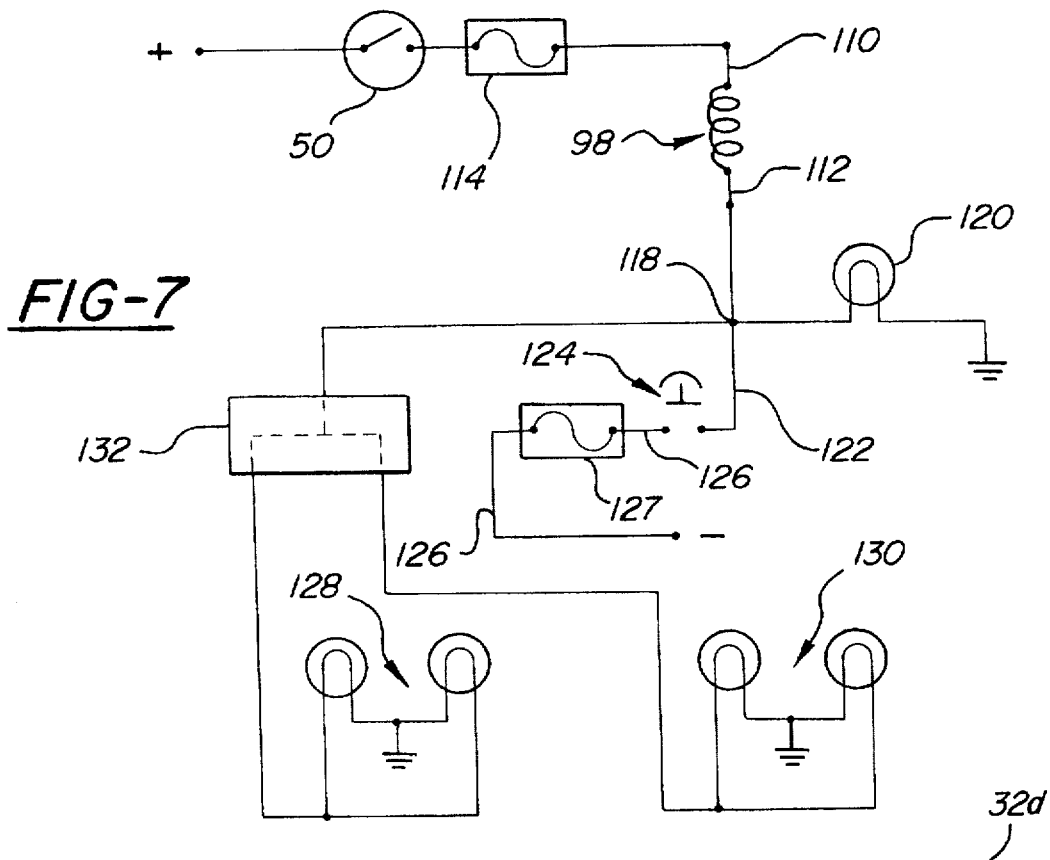
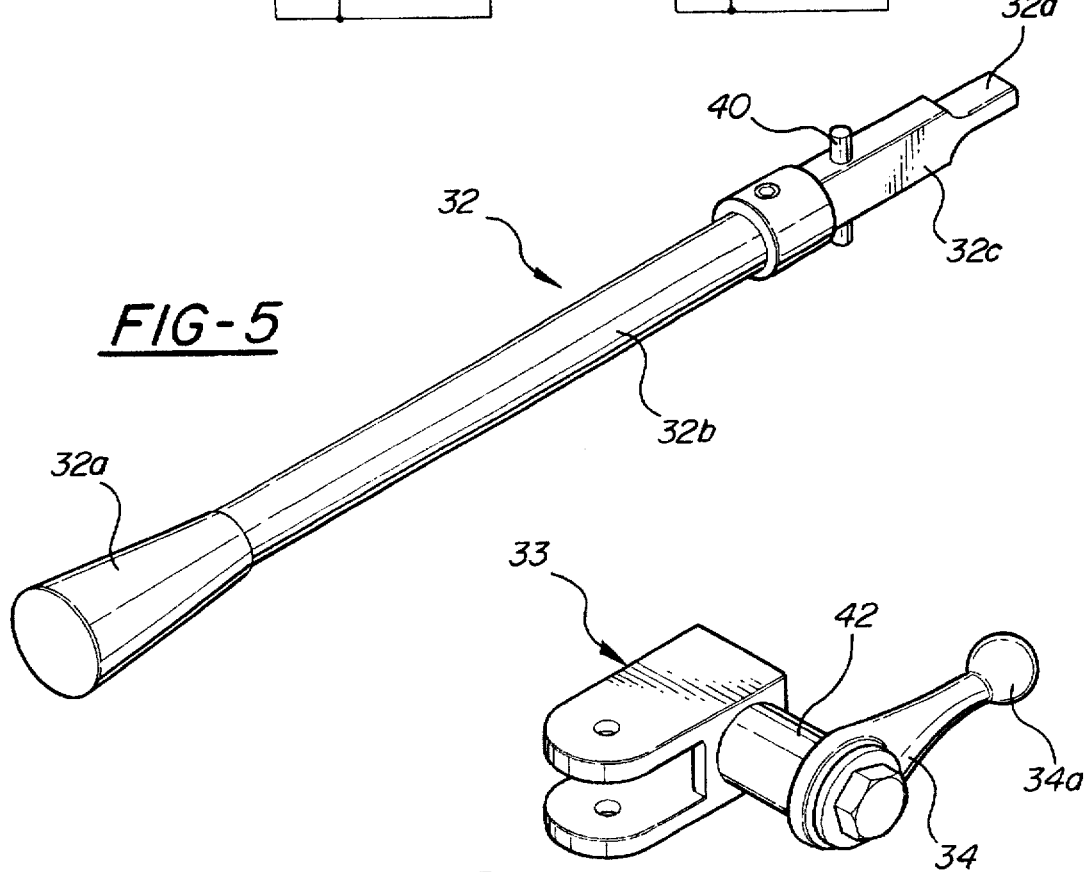

TRANSMISSION SHIFT INTERLOCK

BACKGROUND OF THE INVENTION

This invention relates to a shift control mechanism for an automatic transmission for a motor vehicle and more particularly to a shift interlock mechanism to preclude undesired or inadvertent shifting of the transmission.

The shift control mechanism for an automatic transmission is typically capable of placing the transmission in either a park mode or various non-park modes by manual actuation of a shift lever. The non-park modes typically include reverse, neutral, and two or more drive positions. The shift control mechanism typically includes a detent mechanism which coacts with the shift lever to define each shift position and impede inadvertent movement of the shift lever out of any given shift position.

Most automatic transmissions also include some provision for locking the shift lever in the park detent position while the ignition switch is in the off position as an aid to theft prevention. Most automatic transmissions further include a brake shift interlock whereby the shift lever inhibited from being moved out of the park detent position unless and until the service brakes of the vehicle are applied. This precludes undesired acceleration of the vehicle resulting from inadvertent movement of the shift lever from the park to a drive or reverse position.

It is important that the ignition/switch interlock and the brake/switch interlock be provided in a cost effective manner.

SUMMARY OF THE INVENTION

This invention is directed to the provision of an improved transmission shift interlock mechanism for use on a vehicle having an automatic transmission.

More specifically, this invention is directed to the provision of a transmission shift interlock mechanism that is cost effective.

This invention is further directed to the provision of an improved holding device that is especially suitable for use in a transmission shift interlock mechanism.

The holding device according to the invention comprises a housing; an annular electromagnet positioned within the housing and having a central passage therethrough; an annular armature formed of a thermomagnetic material and having a central aperture; an elongated tubular stem formed of a non-magnetic material, having a reduced diameter as compared to the armature, centrally secured at one end thereof to the armature with the central passage of the stem coaxial with the aperture of the armature, and positioned slidably in the central passage of the electromagnet with the annular outer portion of the armature radially outwardly of the stem positioned proximate a rear annular face of the electromagnet and the free end of the stem extending forwardly beyond a front annular face of the electromagnet and defining an abutment surface; a cable extending slidably through the armature aperture and through the tubular stem; and abutment means on the cable defining an abutment surface rigid with the cable proximate the stem abutment surface. With this arrangement, and with the electromagnet deenergized, the cable is free to move in either axial direction relative to the housing by axial sliding movement within the stem but, with the electromagnet energized and the annular outer portion of the armature held magnetically against the rear annular face of the electromagnet, the cable is free to move axially forwardly relative to the housing by axial sliding movement within the stem but is precluded from moving axially rearwardly relative to the housing by engagement of the abutment surfaces and the magnetic attraction of the armature to the electromagnet. The use of a separate abutment surface on the cable for coaction with the abutment surface defined on the stem facilitates assembly of the holding device and specifically allows successful and reliable operation of the holding device over a wide range of assembly and part dimension tolerances.

According to a further feature of the invention, the holding device is utilized to provide the brake/shift interlock for a transmission shift interlock system wherein the ignition shift interlock is provided by a cable extending between the ignition switch and a park/lock member and the invention holding device is piggy-backed on the cable so that the holding device cable is constituted by the ignition shift interlock cable.

In the disclosed embodiment of the invention, the invention holding device is utilized as the brake/shift interlock of a steering column mounted shift control mechanism and provides a compact, reliable, efficient shift interlock mechanism especially suitable for use in a steering column shift environment.

BRIEF DESCRIPTION OF THE DRAWINGS

FIGS. 5 and 6 are detail perspective views of portions of the shift lever mechanism; and FIG. 7 is a generalized circuit diagram showing the electrical operation of the invention shift interlock.

DETAILED DESCRIPTION OF THE PREFERRED EMBODIMENTS

Figure 1:
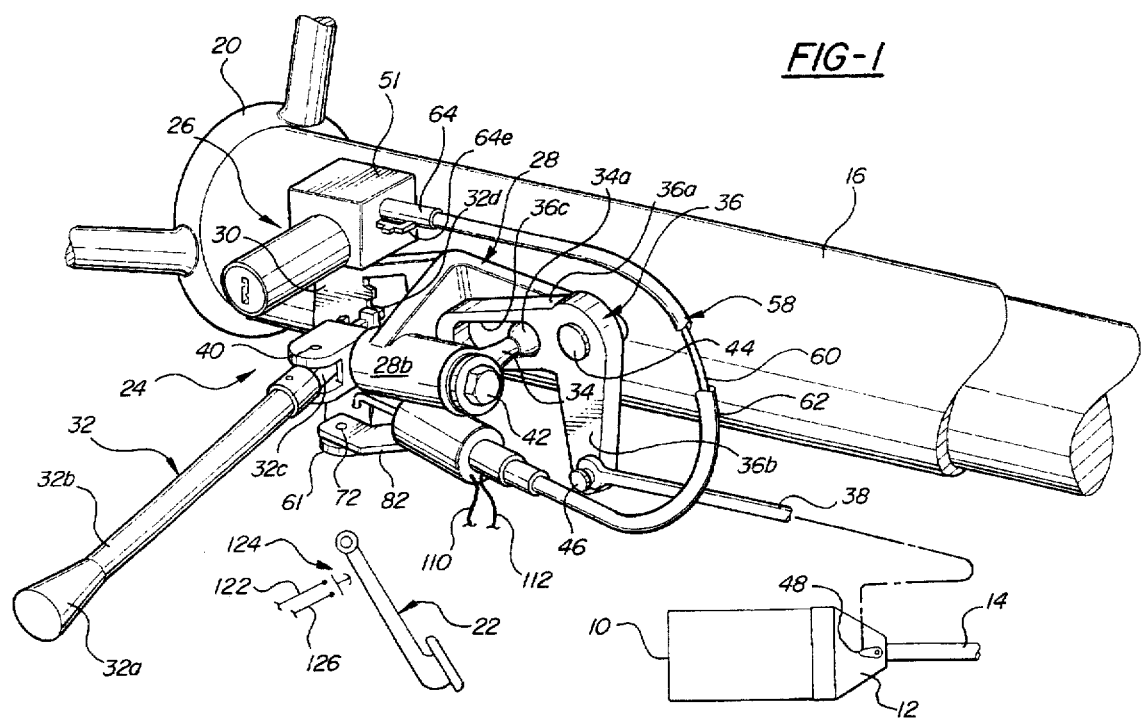
FIG. 1 is a perspective somewhat schematic view of a transmission shift interlock according to the invention shown in association with a vehicular steering column.

The invention shift interlock is seen in FIG. 1 in association with a motor vehicle, such for example as an automobile, including an engine 10, an automatic transmission 12, a drive shaft 14, a steering column 16 including a steering shaft 18 associated with a steering wheel 20, a service brake 22, a shift control mechanism 24, and an ignition switch assembly 26.

Shift control mechanism 24 (FIGS. 1, 4 and 5) includes a mounting bracket 28, a detent plate 30, a shift lever 32, a clevis 33, a crank arm 34, a bell crank 36, and a connecting rod 38.

Mounting bracket 28 is fixedly secured to steering column 16 in underlying relation to steering wheel 20.

Detent plate 30 (see also FIG. 4) may be mounted on bracket 28 or may be secured directly to steering column 16. Plate 30 has a generally arcuate configuration, and defines a plurality of detent notches to define the various transmission shift positions or modes including a park mode detent notch 30a and a plurality of further detent notches 30b defining the further transmission modes.

Shift lever 32 includes an outboard handle portion 32a for access by the vehicle operator, a shaft portion 32b, a pivot portion 32c, and an inboard detent portion defining a detent 32d. Pivot portion 32c is positioned between the upper and lower arms of clevis 33 so as to mount the lever 32 for pivotal movement about a pivot shaft 40 extending between the upper and lower arms of the clevis.

Crank arm 34 is secured to the free end of a pivot shaft 42. Pivot shaft 42 extends at right angles from clevis 33 and is journaled in a journal portion 28b of bracket 28. Shift lever 32 and crank arm 34 may thus be pivoted in unison about the pivot axis defined by pivot shaft 42.

Bell crank 36 is mounted for pivotal movement on a shaft 44 carried by bracket 28 and includes an input arm 36a and an output arm 36b. Input arm 36a includes an elongated slot 36c slidably receiving a ball 34a fixedly mounted on the free end of crank arm 34.

Connecting rod 38 is secured to the free end of bell crank output arm 36b by a pin 46 and is connected in known manner to a conventional mode select lever 48 of the automatic transmission 12.

Pivotal movement of shift lever 32 about pin 40 moves detent 32d in and out of engagement with detent notches 30a, 30b and pivotal movement of arm 32 about the axis of pivot shaft 42 moves the transmission, via arm 34, crank 36, and rod 38, between its various modes with detent 32d moving into successive alignment with respective detent notches corresponding to the respective transmission modes.

Ignition switch assembly 26 includes an ignition switch 50, a switch housing 51, and a switch interlock member 52 (FIG. 2) positioned within housing 51. Switch assembly 26 is mounted on steering column 16 between the steering wheel and the shift control mechanism 24. Switch 50 is arranged for rotary movement, in response to insertion of the proper key, between a plurality of positions including an off position and a run position with the ignition switch interlock 52 moving with the tumbler mechanism of the ignition switch to selectively alter the angular position of a lobe 52a defined by the switch interlock member.

In accordance with the invention, an ignition shift interlock mechanism 54 is provided and a brake shift interlock mechanism 56 is further provided.

Ignition/shift interlock 54 is operative to preclude movement of the transmission out of the park position unless and until the ignition switch is moved to a run position, and brake/shift interlock 56 is operative to preclude movement of the transmission out of the park position unless and until the service brakes are applied.

ignition/shift interlock 54 includes a cable assembly 58 and a park/lock member 61.

Cable assembly 58 includes a cable 60, a sheath 62 slidably encasing the cable, an end fitting 64 connected to the rear end of the cable, and a connector 66 connected to the front end of the cable.

End fitting 64 (FIG. 2) includes a bore 64a receiving the rear end 62a of sheath 62, a bore 64b for slidable passage of cable 60, a counterbore 64c, a further counterbore 64d, and a bayonet fitting 64e. A pin 68 is slidably received in counterbore 64d and is fixedly secured to the rear end 60a of cable 60, and a coil spring 70 received in counterbore 64c urges pin 68 and thereby cable 60 rearwardly or to the left as viewed in FIG. 2. Bayonet fitting 64e is utilized to readily mount the fitting 64 to the housing 51 of the ignition switch assembly with pin 68 urged via spring 70 into engagement with the outer periphery of ignition switch interlock member 52.

Connector 66 has a Z configuration and includes a rear portion 66a fixedly secured to the front end 60b of cable 60, a front portion 66b, and a interconnecting crank portion 66c.

Park/lock member 61 (FIGS. 1 and 4) is in the form of a lever mounted for pivotal movement at one end thereof about a pivot pin 72 mounted, for example, on detent plate 30. Park/lock member 61 includes an interlock structure at its other or free end for coaction with detent 32d. The interlock structure on the park/lock member includes a leading finger portion 61a and a follower finger portion 61b coacting with portion 61a to define a slot 61c. Park/lock member 61 further includes an intermediate aperture 61d receiving the crank portion 66a of connector 66 whereby to pivotally connect the forward end of cable 60 to the park/lock member.

Figure 4:
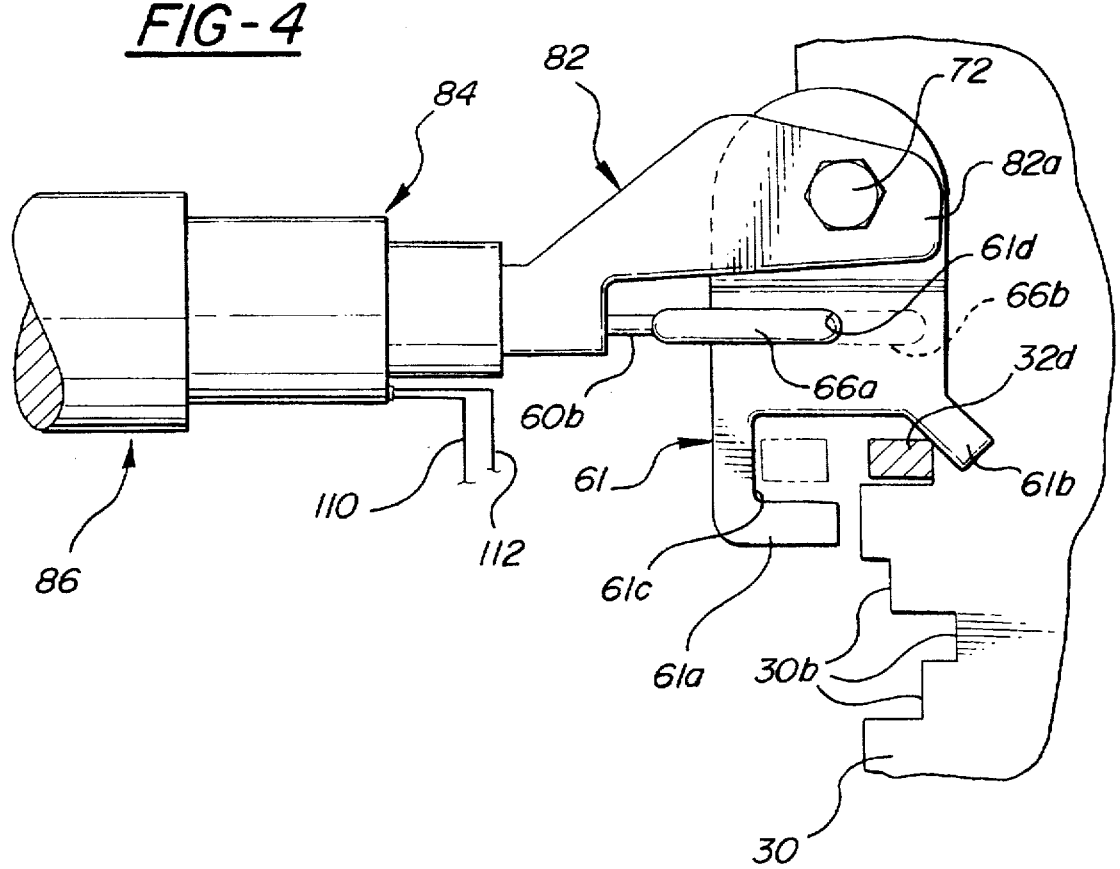
FIG. 4 is a detail view of a portion of the shift interlock.

With reference to FIG. 4, it will be seen that after detent 32d has been moved out of park detent slot 30a and into slot 61c by pivotal movement of shift lever 32 about pin 40, any attempt to thereafter move the detent about the axis of pin 42 to another transmission mode will be blocked by finger portion 61a of park/lock lever 61 to the extent that pivotal movement of the park/lock lever about pivot pin 72 is precluded. Pivotal movement of park/lock member 61 about pin 72 is precluded by the engagement of pin 68 (FIG. 2) with lobe 52a of ignition switch interlock member 52 in so long as the ignition switch is in an off position. When the ignition switch is moved to an on position, the ignition switch interlock member moves to a position where a recess portion 52b of the interlock member is in confronting relation with pin 68 and the pin and thereby the cable is free to move rearwardly or to the left, as viewed in FIG. 2, by an amount equal to the difference in the radius's of lobe 52a and recess 52b. The various system springs and resistances are preferably chosen so that the cable does not move immediately rearwardly or to the left upon movement of the ignition switch to the run position but, rather, the system force balances are such that after detent 32d has been moved out of the park notch 30a by pivotal movement of shift lever 32 about pin 40, the subsequent movement of the detent about the axis of pivot shaft 42 has the effect of engaging the forward finger portion 61a of the park/lock lever and pushing the park/lock lever out of the way by pivotal movement about shaft 72, to allow the detent and the shift lever to move to a new shift mode position. The described ignition/shift interlock will thus be seen to preclude movement of the transmission out of park unless and until the ignition switch is moved to a run position.

Brake/shift interlock 56 comprises an electromagnetic holding device piggy-backed on the ignition/shift interlock, and specifically, piggy-backed on the cable 60 of the ignition/shift interlock.

Brake/shift interlock 56 (FIG. 2) includes a housing assembly 74, an electromagnet assembly 76, an armature assembly 78, and a stop button 80.

Housing assembly 74 includes a mounting bracket 82, a front cylindrical housing 84, a rear cylindrical housing 86, and a rear connector 88. Bracket 82 includes a rear tubular portion 82a swivelly mounted in a counterbore 84a in the forward end of housing 84 by a swivel connection 90 and further includes a plate-like forward mounting portion 82a defining a mounting aperture 82b. Rear housing 86 is cylindrical and is swivelly connected to front housing 84 via a swivel joint 92. Rear connector 88 is swivelly mounted at 94 in a rear hub portion 86a of rear housing 86.

Electromagnet assembly 76 includes a bobbin or canister 96 and a coil 98.

Canister or bobbin 96 is positioned forwardly in housing 84 and includes inner 96a and outer 96b concentric cylindrical walls defining an annular space 96c therebetween.

Coil 98 comprises electrically conductive wire wound in known manner around canister inner wall 96a and occupying annular space 96c. The inner and outer walls of the canister are connected by a front wall 96d but the annular space 96c is open rearwardly.

Armature assembly 78 includes an annular disk shaped armature 100 formed of a ferromagnetic material and a tubular stem 102 formed of a non-magnetic material.

Stem 102 has a reduced diameter as compared to the diameter of the armature, and is centrally secured at its rear end, as by staking 102d, to the armature with the central passage 102a of the stem coaxial with a central aperture 100a in the armature. Stem 102 is positioned slidably in the central passage 104 defined by the inner wall 96a of the canister with the annular outer portion 100b of the armature, radially outwardly of the stem, positioned proximate the rear annular face of coil 98 and the stem extending forwardly beyond the front wall 96d of the canister and through a bore 84b in housing 84 to position the free forward end 102b of the stem within tubular portion 82a of bracket 82 and define an annular abutment surface 102c at its forward edge.

A cavity 106 is defined rearwardly of the armature assembly within the housing assembly and a coil spring 108 is positioned in cavity 106 and biases armature 100 forwardly toward coil 98.

Stop button 80 is in the form of an annular collar crimped to cable 60 forwardly of but proximate abutment surface 102c and defining a rearward abutment surface 80a for coaction with abutment surface 102c. Abutment surfaces 102c and 80a may be separated, for example, by a distance of 1 millimeter.

In the assembled relation of the brake/shift interlock, aperture 82b in bracket 82 is mounted on pivot shaft 72 and the front end 62 of sheath 62 is received in connector 88 with cable 60 passing centrally through the electrical magnetic assembly and specifically passing slidably through the central passage 102a of the tubular stem 102 for connection to connector 66.

Figure 2:
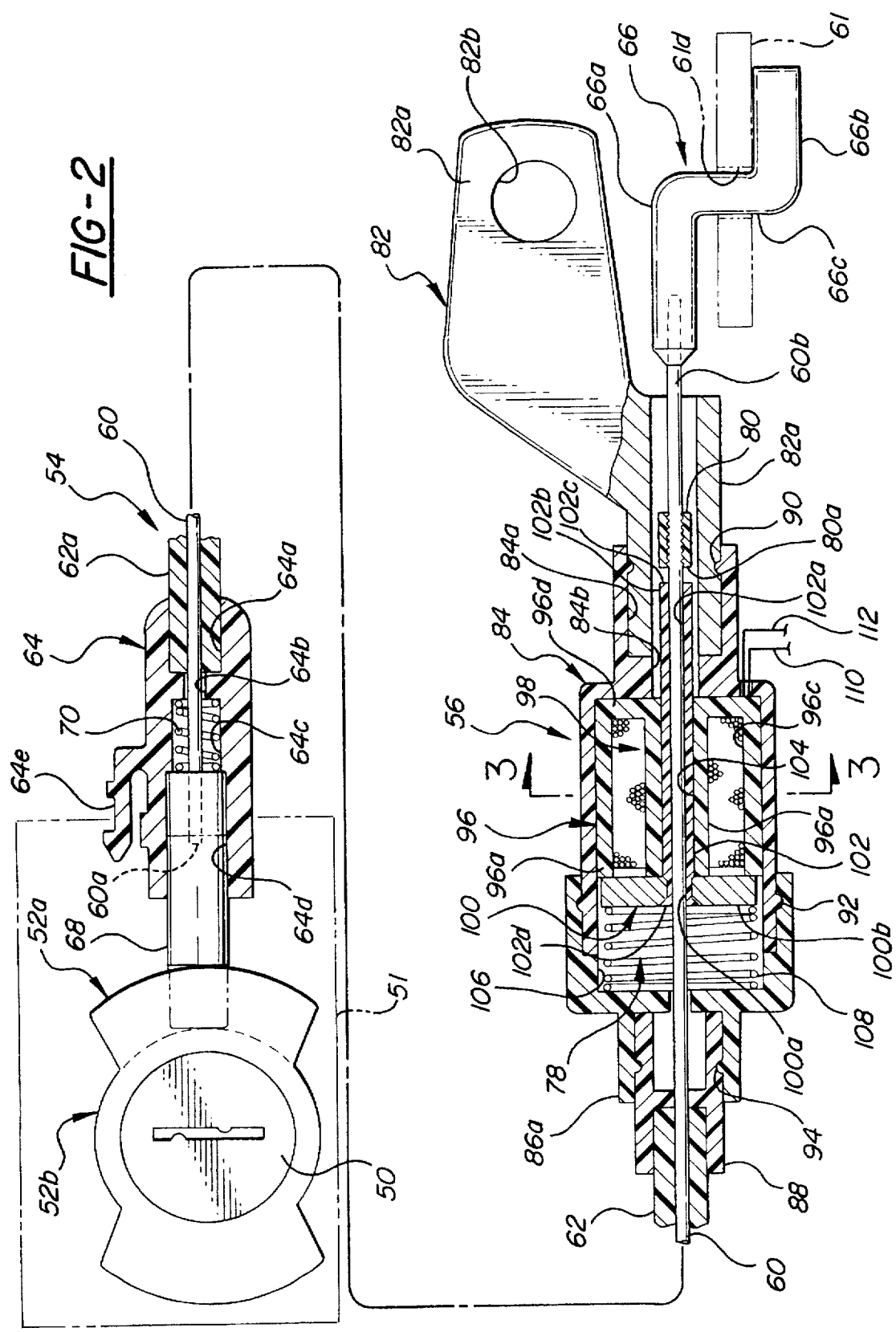
FIG. 2 is a somewhat diagrammatic view of the invention transmission shift interlock.
Figure 3:
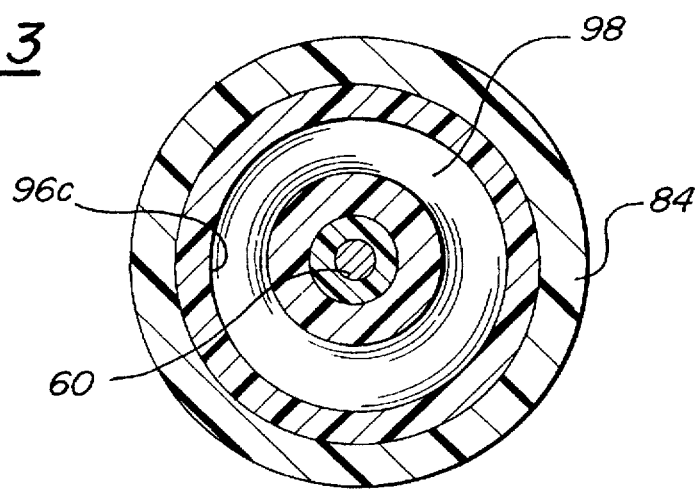
FIG. 3 is a cross-sectional view taken on line 3—3 of FIG. 2.

Leads 110 and 112 connect to opposite ends of coil 98 as seen in FIGS. 2 and 7. With continued reference to FIG. 7, the generalized schematic diagram shown therein includes a positive battery terminal, ignition switch 50, a fuse 114, lead 110, coil 98, lead 112, and a lead 116 extending to a junction 118. Junction 118 connects to a center high mount brake stop lamp 120 and also connects via a lead 122 to a normally open brake switch 124 which is connected to the negative battery terminal by a lead 126 passing through a fuse 127. Left and right stop lamps 128, 130 are also connected to junction 118 through a multi-function switch block 132 of known configuration. Preferably one or more diodes (not shown) are included in the electrical circuit of the holding device so as to assure proper polarization of the device and to prevent the propagation of inductive noise or other transients through circuitry attached thereto. Various configurations of diodes may be employed to achieve polarity protection and/or switching and/or noise suppression.

When the ignition switch is moved to a run position, battery voltage is fed to the coil 98 and the coil is energized by completion of a path through any of the brake lights 120, 128 or 130, which do not illuminate since a minimal amount of current is drawn by the coil. The energized coil magnetically pulls the armature 100 against the rear or left side of the coil, as viewed in FIG. 2, so that any attempted movement of cable 60 in the rearward or left direction is precluded by the attraction of the armature to the coil and the immediate abutting engagement of the abutment surfaces 102c and 80a. When the brake pedal 22 is depressed, and the brake switch 124 is thereby actuated to its closed position, battery potential is placed on the brake light circuit at juncture 118 which also places that same potential on terminal 112 of the coil. Since substantially the same potential now appears on both terminals of the coil, the coil will be deenergized thereby releasing the armature 100 and allowing cable 60 to move rearwardly.

It will be seen, therefore, that shift lever 32 cannot be moved out of the park position unless and until the ignition switch has been moved to a run position and the brake pedal has been applied. Specifically, as the ignition switch is moved to the run position, the coil is energized as seen in FIG. 7 to attract the armature and preclude rearward or leftward movement of the cable even though the cable is otherwise free to move rearward by virtue of movement of the ignition switch to its run position. When the brake pedal is thereafter applied, the coil is deenergized, the armature 100 is released, and the cable 60 is now free to move rearwardly under the urging of the shift lever and, specifically, under the urging of detent 32d against the forward finger portion 61a of park/lock member 61.

The electromagnetic holding device 56, as compared to prior art electromagnet holding devices, has the advantage of allowing greater tolerance with respect to manufacturing procedures and with respect to part dimensions. Specifically, it is critical that the armature 100 define a specific gap between the armature and the coil in order for the coil and armature to develop sufficient attractive force to preclude leftward or rearward movement of the cable. In the invention arrangement, the armature is free to seek this ideal gap position by virtue of the sliding relationship between the cable and the tubular stem 102, as compared to a construction in which the tubular stem is crimped or otherwise attached to the cable.

Whereas a preferred embodiment of the invention has been illustrated and described in detail, it will be apparent that various changes may be made in the disclosed embodiment without deploring the scope or spirit of the invention.

We claim:

1. An electromagnetic holding device comprising:

a housing;

an annular electromagnet positioned within the housing and having a central passage therethrough;

an annular armature formed of a ferromagnetic material and having a central aperture;

an elongated tubular stem formed of a non-magnetic material, having a reduced diameter as compared to the armature, centrally secured at one end thereof to the armature with the central passage of the stem coaxial with the aperture of the armature, and positioned slidably in the central passage of the electromagnet with the annular outer portion of the armature radially outwardly of the stem positioned proximate a rear annular face of the electromagnet and the free end of the stem extending forwardly beyond a front annular face of the electromagnet and defining an abutment surface;

a cable extending slidably through the armature aperture and through the tubular stem; and abutment means on the cable defining an abutment surface rigid with the cable proximate the stem abutment surface, whereby with the electromagnet deenergized the cable is free to move in either axial direction relative to the housing by axial sliding movement within the stem but, with the electromagnet energized and the annular outer portion of the armature held magnetically against the rear annular face of the electromagnet, the cable is free to move axially forwardly relative to the housing by axial sliding movement within the stem but is precluded from moving axially rearwardly relative to the housing by engagement of the abutment surfaces and the magnetic attraction of the armature to the electromagnet.

2. An electromagnetic holding device according to claim 1 wherein the abutment means comprises a collar fixed on the cable forwardly of and proximate the free end of the stem.

3. An electromagnetic holding device according to claim 1 wherein:

the housing defines an annular chamber rearwardly of the armature and surrounding the cable; and the electromagnetic holding device further includes a coil spring positioned in the annular chamber in surrounding relation to the cable and biased against a rear annular face of the armature to urge the armature forwardly toward the rear annular face of the electromagnetic.

4. An electromagnetic holding device according to claim 1 wherein:

the electromagnet includes a canister having inner and outer concentric cylindrical walls defining an annular space therebetween a coil of electrically conductive wire disposed with the annular space; and the central passage of the electromagnet is defined by the inner cylindrical canister wall.

5. A transmission shift interlock for use on a vehicle having service brakes, an automatic transmission having a park mode and non-park modes, a body structure, a shift lever mounted on the body structure and moveable between shift positions corresponding respectively to the transmission modes, and an ignition switch having off and run positions, the transmission shift interlock including an ignition/shift interlock including a park/lock member mounted on the body structure proximate the shift lever and moveable between a lock position in which the shift lever is locked in the park position and an unlock position in which the shift lever may be moved out of the park position, a cable extending between the ignition switch and the park/lock member, and means operative in response to movement of the ignition switch to the run position to allow movement of the cable in an unlocking direction to allow movement of the park/lock member to its unlocked position whereby to allow movement of the shift lever out of its park position, and a brake/shift interlock precluding movement of the shift lever out of its park position until the vehicle service brake is applied, the improvement where the brake/shift interlock comprises:

a housing mounted on the body structure;

an annular electromagnet positioned within the housing and having a central passage therethrough;

an annular armature formed of a ferromagnetic material and having a central aperture;

an elongated tubular stem formed of a non-magnetic material, having a reduced diameter as compared to the armature, centrally secured at a rear end thereof to the armature with the central passage of the stem coaxial with the aperture of the armature, the cable passing slidably through the armature aperture and the stem, and the stem positioned slidably in the central passage of the electromagnet with the annular outer portion of the armature, radially outwardly of the stem, positioned proximate a rear annular face of the electromagnet and the free forward end of the stem extending forwardly beyond a front annular face of the coil and defining an abutment surface;

means operative in response to movement of the ignition switch to its run position to energize the coil;

means operative in response to the application of the vehicle service brakes to deenergize the coil; and abutment means on the cable defining an abutment surface rigid with the cable proximate the stem abutment surface, whereby with the ignition switch in its off position and the service brakes released the cable is blocked by the ignition switch to prevent movement of the park/lock member out of its park position, with the ignition switch in its on position and the service brakes released the cable is held by the attraction of the armature to the electromagnet and the engagement of the abutment surfaces to prevent movement of the park/lock member out of its park position, and with the ignition switch in its on position and the service brakes applied the cable is released to allow movement of the park/lock member out of its park position.

6. A transmission shift interlock according to claim 5 wherein the body structure comprises a steering column and the shift lever ignition switch and the park/lock member are mounted on the steering column.

7. A transmission shift interlock according to claim 6 wherein the abutment means comprises a collar fixed on the cable forwardly of and proximate the free end of the stem.

8. A transmission shift interlock according to claim 6 wherein:

the housing defines an annular chamber rearwardly of the armature and surrounding the cable; and the electromagnetic holding device further includes a coil spring positioned in the annular chamber in surrounding relation to the cable and biased against a rear annular face of the armature to urge the armature forwardly toward the rear annular face of the electromagnet.

9. A transmission shift interlock according to claim 6 wherein:

the electromagnet includes a canister having inner and outer concentric cylindrical walls defining an annular space therebetween and a coil of electrically conductive wire disposed within the annular space; and the central passage of the electromagnet is defined by the inner cylindrical canister wall.

10. A transmission shift interlock for use on a vehicle having service brakes, an automatic transmission having a park mode and non-park modes, a steering column, a shift lever mounted on the steering column and moveable between shift positions corresponding respectively to the transmission modes, and an ignition switch mounted on the steering column and having off and run positions, the transmission shift interlock including an ignition shift interlock including a park/lock member mounted on the steering column proximate the shift lever and moveable between a lock position in which the shift lever is locked in the park position and an unlock position in which the shift lever may be moved out of the park position, a cable extending between the ignition switch and the park/lock member, and means operative in response to movement of the ignition switch to the run position to allow movement of the cable in an unlocking direction to allow movement of the park/lock member to its unlocked position whereby to allow movement of the shift lever out of its park position, and a brake shift interlock precluding movement of the shift lever out of its park position until the vehicle service brake is applied, the improvement wherein the brake shift interlock comprises:

a housing mounted on the steering column;

an annular electromagnet positioned within the housing and having a central passage therethrough;

an annular armature formed of a ferromagnetic material and having a central aperture;

an elongated tubular stem formed of a nonmagnetic material, having a reduced diameter as compared to the armature, centrally secured at a rear end thereof to the armature with the central passage of the stem coaxial with the aperture of the armature, the cable passing slidably through the armature aperture and the stem, and the stem positioned slidably in the central passage of the electromagnet with the annular outer portion of the armature, radially outwardly of the stem, positioned proximate a rear annular face of the electromagnet and the free forward end of the stem extending forwardly beyond a forward annular face of the electromagnet and defining an abutment surface;

means operative in response to movement of the ignition switch to its run position to energize the electromagnet;

means operative in response to application of the vehicle service brakes to deenergize the electromagnet; and means on the cable defining an abutment surface rigid with the cable proximate and forwardly of the stem abutment surface, whereby with the ignition switch in its off position and the service brakes released the cable is blocked by the ignition switch to prevent movement of the park/lock member out of its park position, with the ignition switch in its on position and the service brakes released the cable is held by the attraction of the armature to the electromagnet and engagement of the abutment surfaces to prevent movement of the park/lock member out of its park position, and with the ignition switch in its on position and the service brakes applied the cable is released to allow movement of the park/lock member out of its park position.

11. A transmission shift interlock according to claim 10 wherein:

the park/lock member comprises a lever pivoted to the steering column at one end thereof and coacting with the shift lever at another end thereof;

the cable is secured to the lever intermediate the ends of the lever; and the housing is mounted on the steering column proximate the shift lever.

12. A transmission shift interlock according to claim 11 wherein the one end of the lever is mounted on a pivot pin and the housing is mounted on the pivot pin.

* * * * *